Patented Nov. 27, 1928.

1,693,331

UNITED STATES PATENT OFFICE.

WALTER BADER, OF SPONDON, NEAR DERBY, ENGLAND, ASSIGNOR TO CELANESE CORPORATION OF AMERICA, A CORPORATION OF DELAWARE.

MANUFACTURE OF ALIPHATIC COMPOUNDS.

No Drawing. Application filed November 6, 1924, Serial No. 748,285, and in Great Britain January 24, 1924.

This invention relates principally to the manufacture of acetic anhydride. It also relates to making acetic acid or mixtures thereof with acetic anhydride.

It is known that acetic anhydride is decomposed into acetone and carbon dioxide by heat. This reaction is catalyzed by a great number of substances. The literature (see Sabatier-Reid, Catalysis in Organic Chemistry, London 1923) mentions the oxides and carbonates of lithium, calcium, barium, strontium, magnesium, zinc, cadmium, iron, aluminium, chromium, uranium, manganese, thorium, zirconium, titanium, cerium and tin. Many other bodies and mixtures, like charcoal, silica, cement, metallic copper and so on, have the same effect.

It has been found that this reaction is reversible, and therefore can be represented by the following equation:

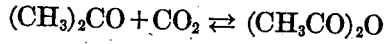

$$(CH_3)_2CO + CO_2 \rightleftarrows (CH_3CO)_2O$$

It has further been found that the reversed reaction, consisting in synthesizing acetic anhydride from acetone and carbon dioxide, can be made a technical process. The same substances which catalyze the decomposition of acetic anhydride also catalyze its synthesis from acetone and carbon dioxide. Catalysts may, however, be omitted, though less advantageously.

While the temperature for the manufacture of acetone from acetic acid or anhydride is usually near 500° C., it may be much lower for the reversed reaction, for instance about 350° C., but there is no marked higher or lower limit of temperature. For practical purposes the temperature is too low when the reaction velocity becomes uneconomical, and too high when undesirable by-products are formed. The reaction has been carried out with good results between the temperatures of 250° C. and 450° C.

The invention may be carried out according to one way, to which we in no wise confine ourselves, by saturating a stream of carbon dioxide with acetone vapours at about 20° C., and leading it through a tube filled with wood charcoal and heated to about 350° C. The liquid which can be condensed out of the carbon dioxide after the passage, by cooling, contains acetic anhydride.

The reaction of the present invention is especially advantageous and gives much higher and it may be even approximately quantitative yields when the ratio of carbon dioxide to acetone is increased. This can be done with advantage by using carbon dioxide under pressure.

The following example illustrates the manner in which the invention may practically be carried out, but the invention is in no way limited to this particular method.

Example.

In a closed system of tubes and containers carbon dioxide is circulated by a pump. The system is connected with a container of liquid carbon dioxide, so that the pressure is everywhere about 750 lbs. per square inch. The streaming gas is made to bubble through acetone at about 100° C., then to pass through a tube heated to 350° C. The tube is filled with pieces of pumice stone on to which manganese carbonate has been precipitated. After passing the tube the gas current is cooled to about 0° C. and the condensate separated. The uncondensed gas re-enters the circulation. The condensate is a mixture of acetone with an amount of acetic anhydride varying according to the conditions, which can be separated in any convenient way, e. g. by fractional distillation.

If water is present in this reaction, be it by the use of an aqueous acetone solution, or by the injection of steam into the system, the acetic anhydride produced is partially or totally converted into acetic acid.

This invention may also be employed for the production of other aliphatic anhydrides or acids by employing the corresponding ketone together with carbon dioxide.

In other words, the reaction may be used generally for the production of compounds theoretically derivable from water by the replacement of hydrogen, wholly or in part, by aliphatic acidyl groups, such compounds therefore being conveniently referred to as aliphatic acidyl derivatives of water.

What I claim and desire to secure by Letters Patent is:—

1. A process for the manufacture of aliphatic acidyl derivatives of water characterized in that a ketone and carbon dioxide are combined.

2. A process according to claim 1, characterized in that the carbon dioxide is employed in excess.

3. A process according to claim 1, characterized by the use of carbon dioxide under pressure.

4. A process according to claim 1, characterized in that the reaction is performed at temperatures between 250° and 450° C.

5. A process according to claim 1, characterized by the use of catalysts of the kind capable of promoting the decomposition of acetic anhydride.

6. A process according to claim 1, characterized in that the reaction takes place in the presence of water.

7. A process for the manufacture of acetyl derivatives of water characterized in that acetone is acted upon with carbon dioxide in excess.

8. A process for the manufacture of acetyl derivatives of water characterized in that acetone is acted upon with carbon dioxide in excess under pressure.

9. A process for the manufacture of acetyl derivatives of water characterized in that acetone is acted upon with carbon dioxide in excess at temperatures between 250° C. and 450° C.

10. A process for the manufacture of acetyl derivatives of water characterized in that acetone is acted upon with carbon dioxide in excess in the presence of catalysts of the kind capable of promoting the decomposition of acetic anhydride.

11. A process for the manufacture of acetyl derivatives of water characterized in that acetone is acted upon with carbon dioxide in excess in the presence of water.

12. A process for the manufacture of acetic anhydride characterized in that acetone is acted upon with carbon dioxide in excess.

13. A process for the manufacture of acetic anhydride characterized in that acetone is acted upon with carbon dioxide in excess under pressure.

14. A process for the manufacture of acetic anhydride characterized in that acetone is acted upon with carbon dioxide in excess in the presence of catalysts of the kind capable of promoting the decomposition of acetic anhydride.

15. A process according to claim 1, characterized by the use of catalysts of the kind which promote the formation of acetone from acetic acid or anhydride.

16. A process for the manufacture of acetyl derivatives of water, characterized in that acetone is acted upon with carbon dioxide in excess in the presence of catalysts of the kind which promote the formation of acetone from acetic acid or anhydride.

17. A process for the manufacture of acetyl derivatives of water, characterized in that acetone is acted upon with carbon dioxide in excess in the presence of a catalyst and water.

In testimony whereof I have hereunto subscribed my name.

WALTER BADER.